(12) United States Patent
Dati et al.

(10) Patent No.: US 7,280,295 B2
(45) Date of Patent: Oct. 9, 2007

(54) METHOD TO IMPROVE DATA RELIABILITY ON HARD DISK DRIVE SYSTEMS

(75) Inventors: Angelo Dati, Pavia (IT); Augusto Andrea Rossi, Pavia (IT); Davide Giovenzana, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 54 days.

(21) Appl. No.: 11/137,946

(22) Filed: May 26, 2005

(65) Prior Publication Data

US 2005/0264907 A1 Dec. 1, 2005

(30) Foreign Application Priority Data

May 31, 2004 (EP) .................................. 04425397

(51) Int. Cl.
*G11B 5/09* (2006.01)

(52) U.S. Cl. .......................................... 360/51; 360/48

(58) Field of Classification Search ..................... None
See application file for complete search history.

(56) References Cited

U.S. PATENT DOCUMENTS

| | | | | |
|---|---|---|---|---|
| 5,036,408 A * | 7/1991 | Leis et al. | ..................... | 360/48 |
| 5,680,267 A * | 10/1997 | Tanaka et al. | ................. | 360/51 |
| 5,844,920 A * | 12/1998 | Zook et al. | .................. | 714/769 |
| 5,905,704 A | 5/1999 | Kato et al. | ..................... | 369/48 |
| 6,009,549 A * | 12/1999 | Bliss et al. | .................. | 714/769 |
| 6,493,162 B1 * | 12/2002 | Fredrickson | ................. | 360/51 |
| 7,019,927 B2 * | 3/2006 | Saito et al. | ................... | 360/51 |
| 7,035,029 B2 * | 4/2006 | Sawada et al. | ............... | 360/51 |
| 7,046,465 B1 * | 5/2006 | Kupferman | .................. | 360/48 |

* cited by examiner

*Primary Examiner*—Andrea Wellington
*Assistant Examiner*—Dismery Mercedes
(74) *Attorney, Agent, or Firm*—Lisa K. Jorgenson; Allen, Dyer, Doppelt, Milbrath & Gilchrist, P.A.

(57) ABSTRACT

A method for storing user data on a hard disk drive system comprises distributing user data across a plurality of independent data sectors, with each data sector including a first header having a first preamble field and a first sync mark field, and a second header having a second preamble field and a second sync mark field. The method performs a first timing recovery phase for recovering signal amplitude by acquiring phase and frequency lock from at least one of the preamble fields, and performs a subsequent frame synchronous detection phase by acquiring a corresponding sync mark field.

20 Claims, 1 Drawing Sheet

METHOD TO IMPROVE DATA RELIABILITY ON HARD DISK DRIVE SYSTEMS

FIELD OF THE INVENTION

The present invention relates to hard disk drive systems, and more particularly, to a method for improving data reliability on a hard disk drive system in which user data items are distributed across a set of independent sectors and appended to a header to ensure adequate signal amplitude and synchronization. A first timing recovering phase recovers proper signal amplitude by acquiring phase and frequency lock from a preamble field, and a subsequent frame synchronous detection phase by acquiring a sync mark field.

BACKGROUND OF THE INVENTION

Data reliability is a major concern in hard disk drive systems. Increased storage capacity requires a continuous evolution of data protection techniques, which are generally regarded in any new system generation as enhanced error correction coding schemes.

User data is normally protected with redundant information to ensure data integrity through time regardless of noisy and defective media support, mechanical shocks and system aging. Each user data item is conveniently distributed across a set of independent frames of regular format, called sectors, with each one section storing up to 512 user eight-bit bytes. The distribution in sectors is generally handled by the system operating the physical drive.

Apart from the need for error correction redundancy, data needs to be appended to a fixed format header. This ensures adequate signal amplitude and synchronization, just to mention two of the various operations that are indispensable for a proper synchronous detection systems.

In the following, timing recovery will be distinguished from frame synchronization. Timing recovery denotes the process through which the optimal sampling phase and frequency are achieved. Frame synchronization denotes the process used to identify the starting position of the payload (data) field within the frame. Since frame synchronization relies on the synchronous detection of a known pattern, referred to as a sync mark, it is apparent that it cannot happen unless timing has been recovered.

The general structure of a data sector is shown in FIG. 1. The illustrated field sizes do not conform to their relative size. The four distinct fields are 4T preamble, synch mark, data and pad.

The 4T preamble field is a known magnetization pattern: 1100—with 1 and 0 denoting the two elementary tiles, equal in size and of opposite magnetization used to record any data pattern—is repeated several times and with the same phase. This field is used to acquire phase and frequency lock, and to recover proper signal amplitude.

The sync mark field is a pattern known a priori by the system and is generally not sector specific. It is written immediately after the preamble to mark the onset of the data field.

The data stores the sector payload, and is generally protected by the error correction code.

The pad field is an appendix generally used for data flush through the signal processing pipeline and inter-sector separation.

With every new HDD system evolution, signal processing needs to evolve to compensate signal to noise ratio reduction due to increased storage and faster data access demand.

From a signal processing standpoint, data reliability is strengthened by evolving the error correction code (ECC) properties of the data field. ECC will be referred to throughout the rest of the description as a general coding and detection strategy without specifying further details.

This approach assumes, however, that the header recovery failure does not jeopardize the system performance even in the noisier scenario. In general, it is assumed that the header can be lengthened for an increased robustness, but even though this is generally true, it bears a data format penalty which should be considered with the same importance of the ECC redundancy budget.

To better analyze data irrecoverably, the main problems experienced by the HDD industry will be taken into account and for which an approach has been provided to successfully recover a sector:

1) a synchronous lock to the read-back signal needs to be reliably achieved, and kept;
2) if lock is achieved, at least over the sector onset, sync mark detection can succeed; and
3) with lock maintained across the entire frame, and the sync mark is correctly identified, data is recovered up to the ECC recovery capability.

The above items are summarized using the following formulas:

$$P(\text{no recovery}) = P(\text{lock lost}) + P(\text{sync lost, locked}) + \ldots P(\text{ECC overwhelmed, (locked and synchronized)})$$

using conditional probabilities, and exploiting previous observations 1-3:

$$P(\text{no recovery}) = P(\text{lock lost}) + \ldots P(\text{sync lost/locked}) * \{1 - P(\text{lock lost})\} + \ldots + P(\text{ECC overwhelmed/synchronized}) * P(\text{synchronized/locked}) * \ldots * \{1 - P(\text{lock lost})\}$$

and finally:

$$P(\text{no recovery}) = P(\text{lock lost}) + \ldots + P(\text{sync lost/locked}) * \{1 - P(\text{lock lost})\} + \ldots = \ldots + P(\text{ECC overwhelmed/synchronized}) * \{1 - P(\text{sync lost})\} * \{1 - P(\text{lock lost})\}$$

which simplifies to:

$$P(\text{no recovery}) = P(\text{lock lost}) + P(\text{sync lost/locked}) + \ldots P(\text{ECC overwhelmed/locked and synchronized}) = P_{LOL} + P_{SYNC} + P_{ECC} \quad [1]$$

provided that each one of the three terms is well under unity. This requirement is easily satisfied in their applications. From this analysis it is apparent that any coding and detection breakthrough that improves $P_{ECC}$ is practically useless unless both $P_{LOL}$ and $P_{SYNC}$ are not improved as well.

Referring now to the first two terms $P_{LOL}$ and $P_{SYNC}$ of the equation [1], each one will now be discussed separately. Timing synchronization is achieved through a digital second order phase lock loop. The dilemma is to balance properly the 4T preamble field length with an additional hardware complexity investment. Given the system trend of fading SNR due to the availability of increasingly efficient ECC protection, more complex timing lock algorithms are required. However, this is without degrading the hardware speed performance.

Any addition to the timing gradient estimation complexity faces almost unavoidably an increment of loop latency, which bears severe consequences on system performance. The latency increase can only partially compensate altering the open loop PLL response.

As shown for instance in the reference "Effect of Loop Delay on Stability of Discrete-Time PLL" (J. W. M. Bergmans, IEEE Trans. Circuit and Systems, vol. 42, no. 4, April 1995) the acquisition speed degrades severely with additional latency in PLLs, thus reducing practical advantages on the frame format of improved algorithms.

Open loop approaches, such as phase restart techniques, are used for precise phase estimation, but not for frequency mismatch tracking. For instance, to reliably estimate a frequency offset of 0.1%, around $10^3$ samples are needed. Assuming a 10% ECC redundancy, there are 512×8×1.1= 4506 samples for the data field. A practical goal for the entire header is to be around 5% of the data section, which is approximately 226 samples. This is less than 25% of the $10^3$ figure.

For the second $P_{SYNC}$ term in equation [1], a known approach is to modify the FIG. 1 format as shown in FIG. 2.

As previously mentioned, the illustrated field sizes do not conform to their relative size. A practical ratio between the two data file sizes is length(data1)/length(data2) which is approximately 20/390, i.e., about 0.05. The two sync fields are generally of comparable length.

There are two sync mark fields, separated by a data section. The length of each sync mark field is approximately the same as the sync mark field of FIG. 1.

Though lengthening a sync mark field is generally possible to exceed comfortable target specifications for $P_{SYNC}$ in normal noisy conditions with patterns shorter than 30 bits, and it is fair to say that denoting with sync0 the sync pattern used in a FIG. 1 format such as:

length(sync0)=length(sync1)+length(sync2), it is possible to match at least the frame synchronization performance in the FIG. 2 scheme.

Generally, a catastrophic loss of the sync mark is due to an undetected media defect localized over the sync mark area. This event can have a likelihood $P_{Defect}$ greater than $P_{SYNC}$. By splitting the sync mark field using a chunk of data, this ensures that only extremely long and extremely unlikely media defects can simultaneously destroy both synchronization features. In this case, as long as $P_{Defect} > P_{SYNC} > (P_{Defect})^2$, the scheme is effective.

In general, $P_{Defect}$ is a function of the defect length. A 'defect scan' performed over each disk surface at least at manufacturing time ensures that defective disk areas are not used for data storage. The longer the defect, generally the more effective is its reliable location. In fact, a long defect will yield the largest energy fluctuation with respect to a correctly magnetized media.

Distance between sync1 and sync2 patterns depends on which is the longest undetected defect that can be assumed as rare as $P_{SYNC}$ and on maximum ECC recovery capability, given that in the case of a sync1 loss the data chunk data1 has to be totally inferred from redundancy over the data2 field. Using just this second argument, we could assume a maximum separation of around 20*8=400 bits between the two. There is no preamble section dedicated to the sync2 field. This is to reduce format penalization.

Still using the defect arguments, it is possible, however, that the defect that caused the loss of the first sync mark pattern in the frame also eroded the last preamble section, thus weakening the timing acquisition. In this case we cannot say that the second sync mark pattern is unaffected by the defect over the first one, as it cannot be guaranteed a correct synchronization over this section which is yet in the first section of the frame.

Furthermore, burdening the ECC system with the task of recovering from scratch the data section data1 prevents optimal ECC protection allocation along the rest of the payload field data2. Moreover, current loop architectures cannot cope with increasing data rates without degrading performance. For instance, a known approach disclosed in European Patent Application No. 0898373 provides an improvement margin that is not substantial, despite a long research effort.

SUMMARY OF THE INVENTION

In view of the foregoing background, an object of the present invention is to provide a method for improving data reliability on hard disk drive systems to overcome, in a straightforward and economical way, the above referenced drawbacks in the prior art.

This and other objects, advantages and features in accordance with the present invention are provided by a method for storing user data on a hard disk drive system comprising distributing user data across a plurality of independent data sectors. Each data sector comprises a first header comprising a first preamble field and a first sync mark field, and a second header comprising a second preamble field and a second sync mark field.

The method may further comprise performing a first timing recovery phase for recovering signal amplitude by acquiring phase and frequency lock from at least one of the preamble fields, and performing a subsequent frame synchronous detection phase by acquiring a corresponding sync mark field. A data field separates the first and second headers, and the data field may be decoded after the second sync mark field has been detected.

BRIEF DESCRIPTION OF THE DRAWINGS

The advantages and characteristics of the method to improve data reliability on hard disk drive systems, according to the present invention, will become clearer from the description of an embodiment thereof, made hereinafter with reference to the attached drawings given for illustrative purposes which are not to be limiting.

DETAILED DESCRIPTION OF THE PREFERRED EMBODIMENTS

Figure 3:
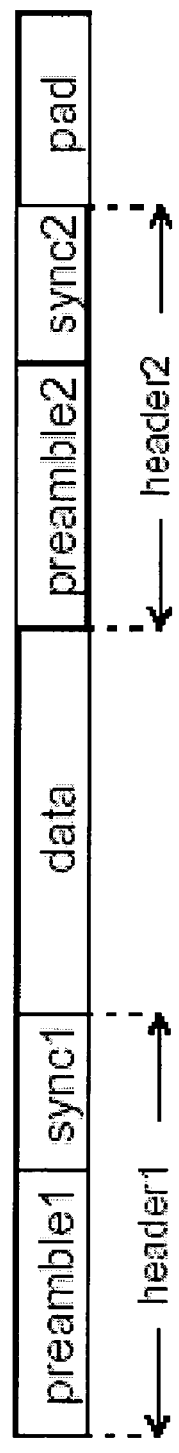
FIG. 3 schematically shows a hard disk drive data sector format according to the present invention.

With specific reference to FIG. 3, a method to improve data reliability on hard disk drive systems in accordance with the present invention is disclosed while making reference to the hard disk drive (HDD) data sector format globally indicated by reference 1. In an HDD system both the disk writer and reader are normally embedded in the same platform. Consequently it is possible to alter the header structure.

Figure 2:
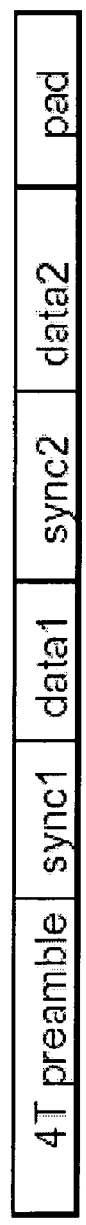
FIG. 2 schematically shows an alternative hard disk drive data sector format according to the prior art.

Using the same total header length as in FIG. 2, the present invention provides the data sector as in the scheme of FIG. 3 wherein the first header1 includes a first preamble and a first sync1 mark field, and a second header2 includes a second preamble and a second sync2 mark field. The first header1 and the second header2 are separated by a data section or field. In this respect, it is important to note that field sizes in the picture do not conform to their relative size, as illustrated.

The method advantageously allows the joint improvement of the equation [1] $P_{LOL}$ and $P_{SYNC}$ terms. The decoding sequence of all FIG. 1 frame components, and of all FIG. 2 frame components as well, with the possible exception of the data1 field, reflects the same order in which they are written. In the scheme of FIG. 3, it is possible to start decoding the data section after the sync2 detection.

This strategy implies a buffer capability in the system, which is not required in any of the prior art schemes. There is a need to store at least two sectors to be able to acquire a new sector while processing the previous one.

The invention provides an improvement in the timing lock capabilities. The distance in samples between the two header1 and header 2 sections is known and predetermined. The phase estimate over each preamble section is independent and adequate to reliably detect each sync section.

With this scheme the recovering of a frequency mismatch over each preamble section is not pursued. Consequently, just an open loop technique and/or a first order PLL can be used. The two sync1 and sync2 fields mark the distance between the two preamble sections.

By comparing the measured distance in sampling clock cycles with respect to what is expected, an open loop precise estimate of the average frequency mismatch over the sector is obtained. As the distance between the two 4T preamble fields is at least 1/(8*512), which is approximately 0.24× $10^{-3}$ and is a frequency offset of 0.02%, yields a phase shift which is readily detectable. The residual and localized timing jitter can then be tracked and compensated effectively through re-sampling with a simpler first order PLL, which can use a higher bandwidth and also be implemented with smaller overall latency.

The invention further provides an improvement in the frame synchronization. The two sync fields each provide, as in the scheme of FIG. 2, an independent reference. This enables the same level of defect protection as in the previous case.

Indeed, separation now spans the entire data sector, and there is no further need to consider average defect length to determine the adequate gap size. Each field relies on its own preamble for timing closure, hence, the two header detection is truly independent.

However, in case one of the fields is not recovered, it is not possible to benefit on the timing lock protection using the open loop frequency estimator. In this case, there are two options:

a) using the estimate of one of the two 4T preamble fields: given that the failing sync section is known, it is assumed that the synch section is defect free and that estimate for the frequency error is used. Alternatively, the average of the frequency error estimate of both fields can be used.

b) adding an additional weak sync feature in each preamble, separated from the sync mark onset in each header by at least the size of the longest defect type with mis-detection likelihood of at least $P_{SYNC}$.

Figure 1:
FIG. 1 schematically shows a hard disk drive data sector format according to the prior art.

For the first case (a) when hit by a sync loss, the system relies on a weaker lock robustness, as each preamble field is now about half the size of the original preamble field illustrated in FIG. 1. This can be acceptable based upon rewriting $P_{LOL}$ as:

$P_{LOL}=P\{\text{no lock, no defect happened}\}+P\{\text{no lock, a sync feature with defect}\}=\ldots =P\{\text{no lock, no defect happened}\}+P\{\text{no lock|defect}\}*P_{Defect}$ for the case where it is necessary to rely only on half the preamble corresponds to the second term, hence mitigated by the defect likelihood itself.

For the second case (b), a sync feature is simply inserted by a phase rotation in the preamble. In fact, looking at the 4T preamble field, the sequence 1100 is always repeated with the same phase.

Denoting as pre=[1100], –pre=[0011], and $\text{rep}_N(\text{pat})$ the sequence {pat, pat, . . . , pat} with pattern pat repeated exactly N times, we have for a conventional 4T preamble:

[4T]=$\text{rep}_N(\text{pre})$ an alternative preamble shape proposed is:

[4T ALT]={$\text{rep}_{N-M}(\text{pre})$, $\text{rep}_M(-\text{pre})$}

Reference is now made to the phase inversion feature as a weak sync mark. Part of the discussion used for the FIG. 2 frame is repeated:

$P\{\text{sync loss}\}=P\{\text{main sync loss, weak sync loss}\}=\ldots =P\{\text{weak sync loss|main sync loss}\}*P\{\text{main sync loss}\}=\ldots P\{\text{weak sync loss}\}*P\{\text{main sync loss}\}\approx P\{\text{weak sync loss}\}*P_{Defect}$ It may readily be seen that it is only necessary to require:

$P\{\text{weak sync loss}\} \leq P_{SYNC}/P_{Defect}$

As stated in the above notes, the method according to the present invention has an advantage of obtaining a more robust synchronization.

A HDD system implementing this method depends mainly on:

1) Loops lock (mainly timing) over the entire sector frame;

2) Correct frame synchronization (address mark recovery); and

3) Reliable detection (Viterbi and ECC).

System failure probability is roughly:

$P(\text{Fail})=P(\text{Lock Loss})+P(\text{AM miss})+P(\text{too many err})$

Target P(Fail) is around 1E–12 after ECC.

The channel needs to operate at least above the bit error rate (BER) 1E–4 because while the ECC could cope with more errors, the timing lock is lost too often. With this method, PGR is available on both ends of a data sector, and interpolates for frequency errors. No closed loop operation is requested.

All loops are handled in digital form, using maximum likelihood prediction criteria (yielding further improvement in robustness). Breaking any feedback makes block assembly far easier and improves overall design robustness. For instance, all blocks on the data path operate on a request/acknowledgment protocol.

The system allows single frequency operation with the only burden of storing the entire sector frame. At least two sector frames need to be stored to be able to acquire a new sector while processing the previous one.

The method to improve data reliability on hard disk drive systems, as just described, is susceptible to other variations and modifications, all within reach of those skilled in the art, and as such, covered by the scope of protection of the present invention defined in the following claims.

That which is claimed is:

1. A method for storing user data on a hard disk drive system comprising:

distributing user data across a plurality of independent data sectors, each data sector comprising a first header comprising a first preamble field and a first sync mark field, a second header comprising a second preamble field and a second sync mark field, and the first and second sync mark fields being set an expected distance between the first and second preamble fields, and performing a first timing recovery phase for recovering signal amplitude by acquiring phase and frequency lock from at least one of the preamble fields;

performing a subsequent frame synchronous detection phase by acquiring a corresponding sync mark field; and comparing a phase by measuring a distance in sampling clock cycles with respect to the expected distance for obtaining an open loop precise estimate of an average frequency mismatch over a data sector.

2. A method according to claim 1, wherein a distance in samples between the first and the second headers is predetermined.

3. A method according to claim 1, wherein each data sector comprises a data field, and wherein a decoding phase of the data field is started only after the second sync mark field has been detected.

4. A method according to claim 1, wherein each synch mark field relies on its own preamble for timing closure so that each header detection is independent.

5. A method according to claim 1, wherein the hard disk drive system includes a buffer capability for acquiring a new data sector while processing a previous data sector.

6. A method according to claim 1, wherein the first and second sync mark fields each provide an independent reference for enabling a same level of defect protection.

7. A method according to claim 1, wherein a portion of a sync mark is inserted by a phase rotation in one of the preambles using an open loop frequency estimator when a timing lock protection is missing.

8. A method for storing user data on a hard disk drive system comprising:

distributing user data user items across a plurality of independent data sectors, each data sector comprising a first header comprising a first preamble field and a first sync mark field, a second header comprising a second preamble field and a second sync mark field, a data field separating the first and second headers, and the first and second sync mark fields each providing an independent reference for enabling a same level of defect protection;

performing a first timing recovery phase for recovering signal amplitude by acquiring phase and frequency lock from at least one of the preamble fields, and performing a subsequent frame synchronous detection phase by acquiring a corresponding sync mark field; and decoding the data field after the second sync mark field has been detected.

9. A method according to claim 8, wherein a distance in samples between the first and the second headers is predetermined.

10. A method according to claim 8, wherein the first and second sync mark fields set a distance between the first and second preamble fields.

11. A method according to claim 10, further comprising a comparing phase by measuring a distance in sampling clock cycles with respect to an expected distance for obtaining an open loop precise estimate of an average frequency mismatch over a data sector.

12. A method according to claim 8, wherein each synch mark field relies on its own preamble for timing closure so that each header detection is independent.

13. A method according to claim 8, wherein the hard disk drive system includes a buffer capability for acquiring a new data sector while processing a previous data sector.

14. A method according to claim 8, wherein a portion of a sync mark is inserted by a phase rotation in one of the preambles using an open loop frequency estimator when a timing lock protection is missing.

15. A method for storing user data on a hard disk drive system comprising:

distributing user data across a plurality of independent data sectors, each data sector comprising a first header comprising a first preamble field and a first sync mark field, and a second header comprising a second preamble field and a second sync mark field, performing a first timing recovery phase for recovering signal amplitude by acquiring phase and frequency lock from at least one of the preamble fields, and performing a subsequent frame synchronous detection phase by acquiring a corresponding sync mark field; and inserting a portion of a sync mark by a phase rotation in one of the preambles using an open loop frequency estimator when a timing lock protection is missing.

16. A method according to claim 15, wherein a distance in samples between the first and the second headers is predetermined.

17. A method according to claim 15, wherein the first and second sync mark fields set a distance between the first and second preamble fields.

18. A method according to claim 15, wherein each data sector comprises a data field, and wherein a decoding phase of the data field is started only after the second sync mark field has been detected.

19. A method according to claim 15, wherein each synch mark field relies on its own preamble for timing closure so that each header detection is independent.

20. A method according to claim 15, wherein the hard disk drive system includes a buffer capability for acquiring a new data sector while processing a previous data sector.

* * * * *